United States Patent Office 2,790,459
Patented Apr. 30, 1957

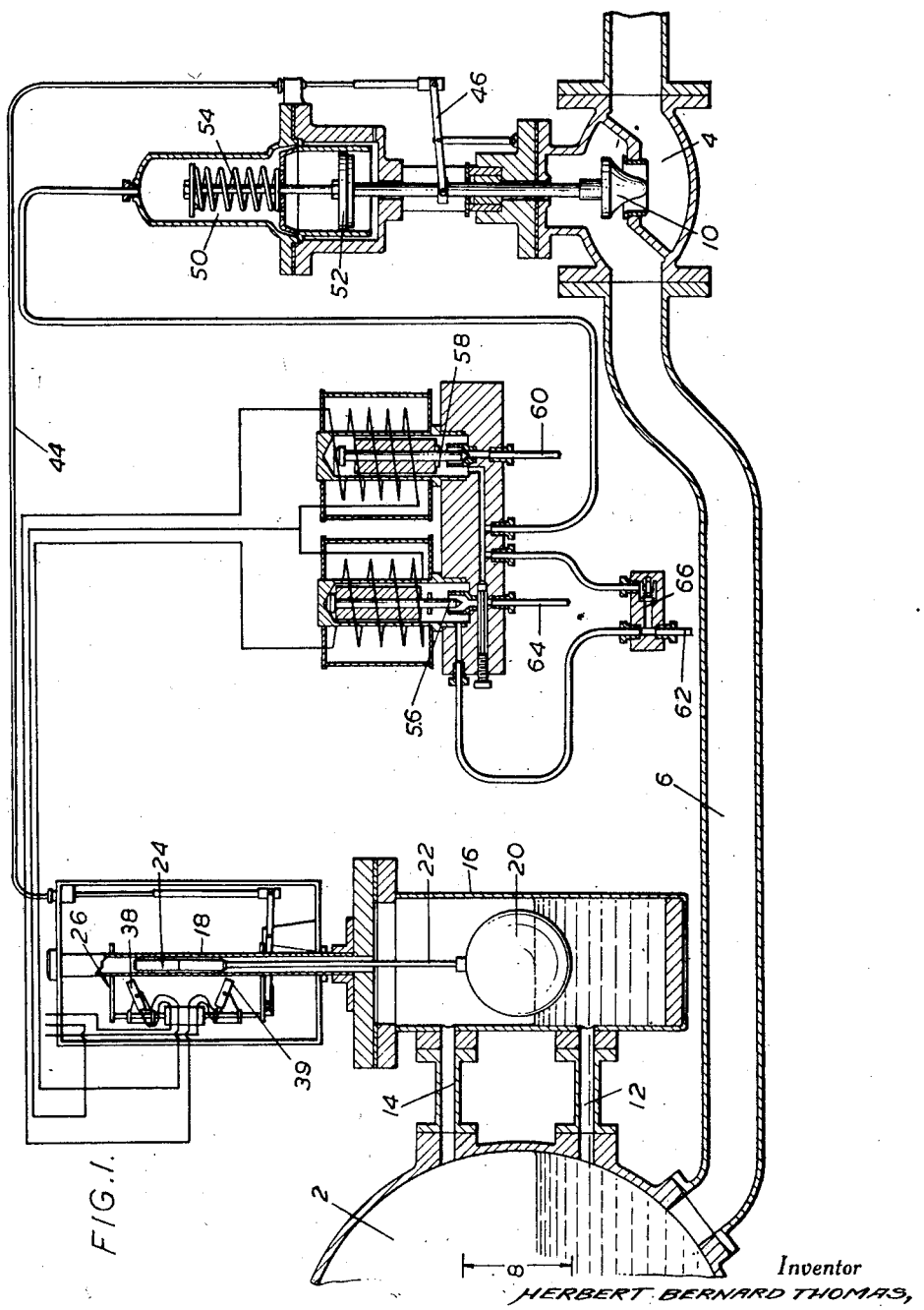

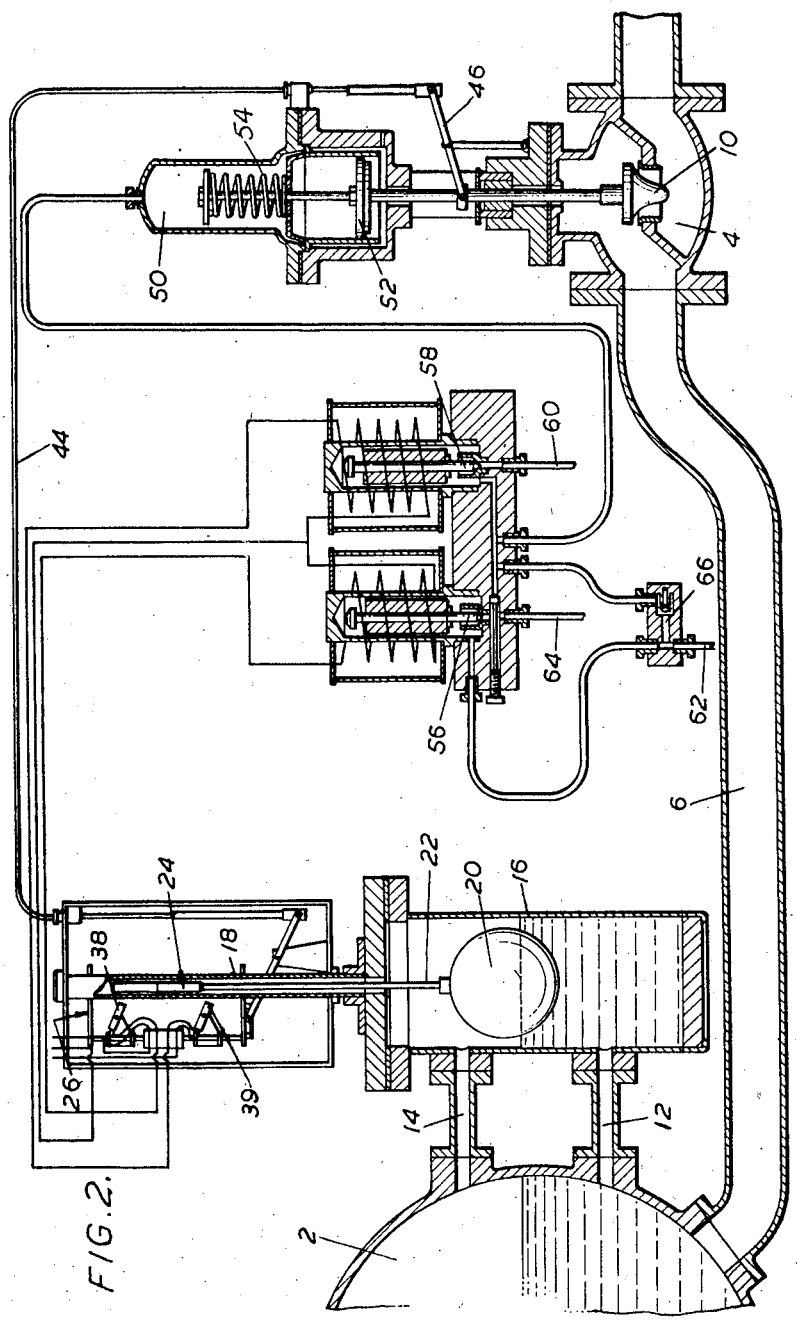

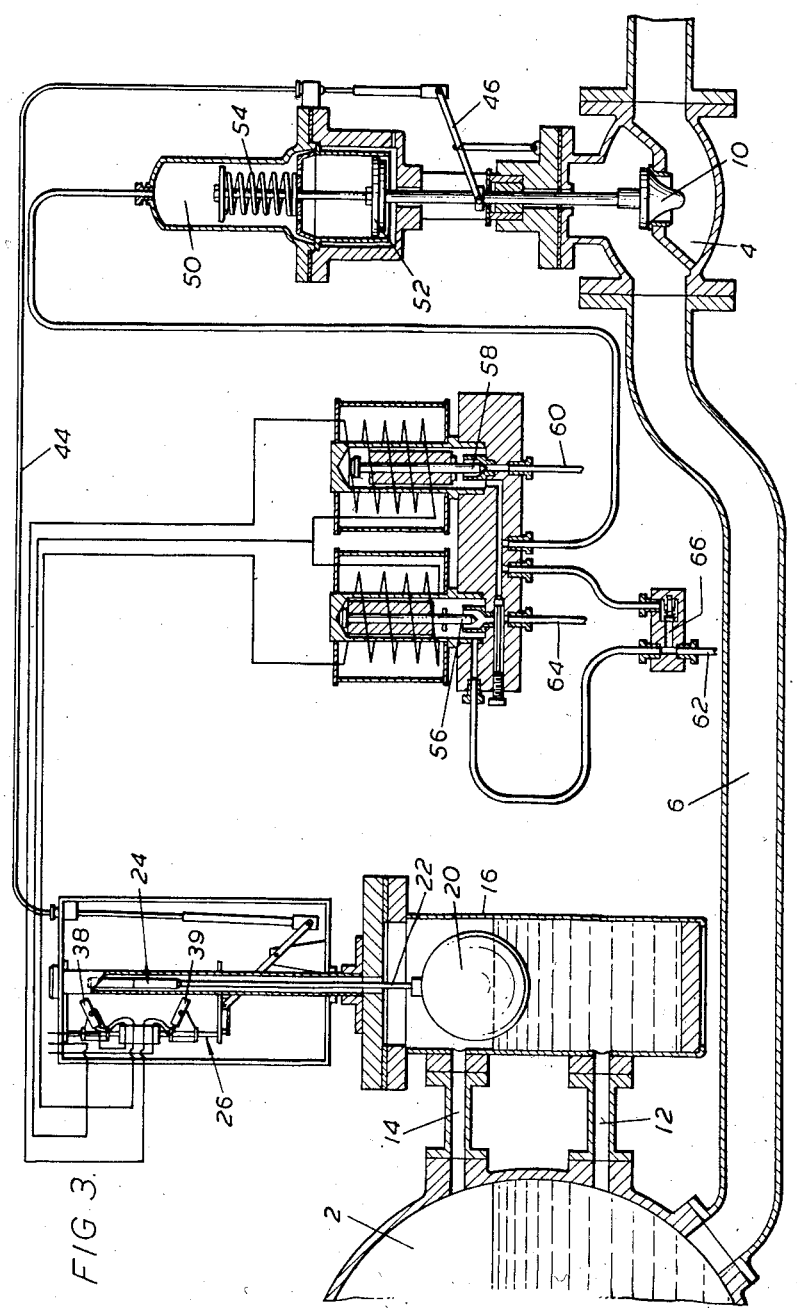

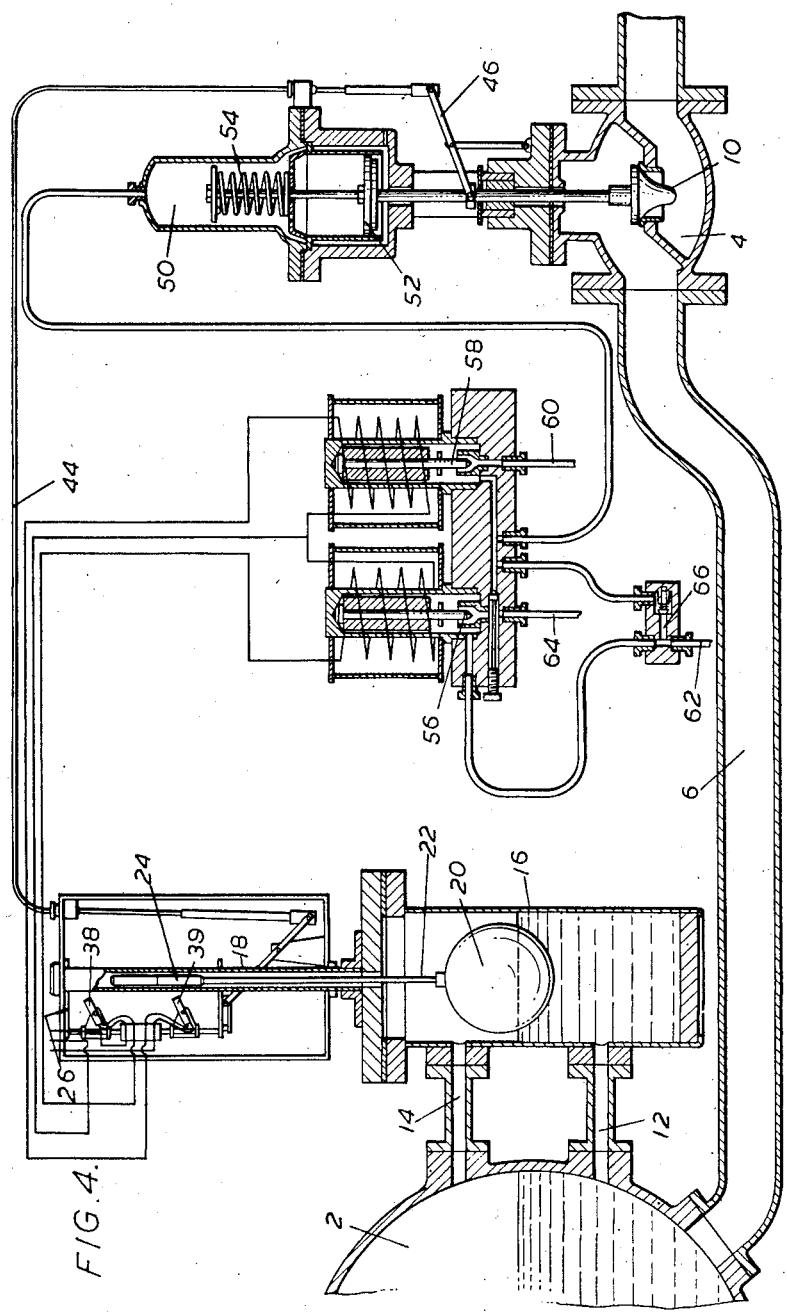

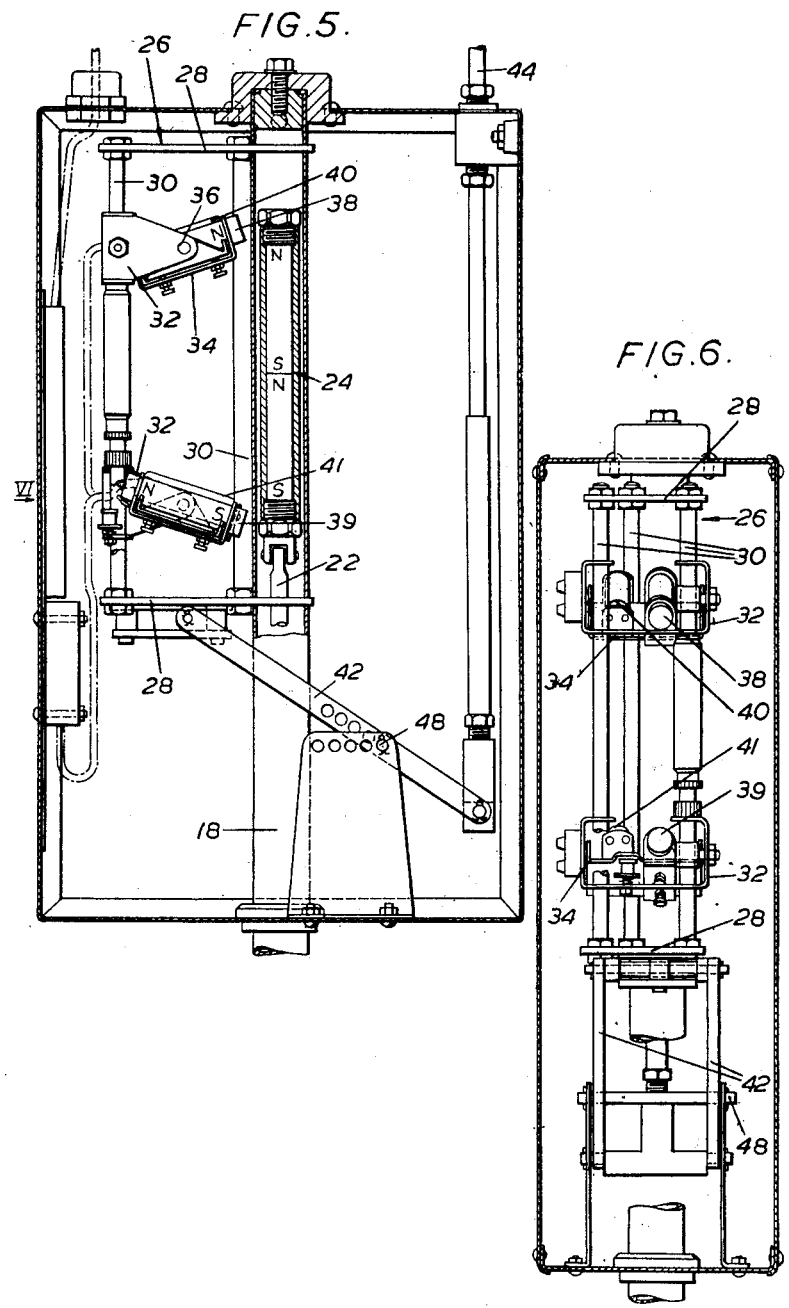

2,790,459

RELAY MECHANISM

Herbert B. Thomas, Slough, England, assignor to Ronald Trist & Co., Limited, Slough, England, a British company Application January 6, 1953, Serial No. 329,888

12 Claims. (Cl. 137—412)

This invention relates broadly to apparatus for controlling the movement of one member in accordance with the movement of another, which may be regarded as a prime mover and which has small operating power so that some form of relay or servo mechanism must be provided. The invention is particularly applicable to apparatus in which the prime mover is a float responsive to the level of liquid in a container and the controlled member is a valve member which must respond to variations in the level of the liquid and thus progressively controls a supply of liquid to the container. Such an apparatus may be used for controlling the supply of feed water to a steam boiler or of sugar juice to a evaporator, and the float is generally mounted in a small chamber connected to both the liquid and vapour spaces in the boiler or evaporator.

Specifically the invention relates to apparatus of the kind in which there is a relay comprising two movable parts, one moved by the float or other prime mover and the other by the supply valve or other controlled member; when the first part moves, the relative position of the two parts is of course changed, and this change is utilised to cause movement of the supply valve or other controlled member, and hence of the second part of the relay device in the direction required to restore the initial relative position of the two parts.

In apparatus of this kind now in use, the relay is a piston valve with a sleeve between the piston and cylinder (the sleeve and piston being the two parts described above), and this relay valve controls compressed air by which the supply valve or other controlled member is operated. The piston is mechanically moved by the float, and this is disadvantageous for several reasons. First it is necessary to make a rod or the like pass through the container wall in order to transmit motion to the piston, and this necessitates the provision of a gland in the wall of the container, which is usually under pressure. Secondly, a suitable supply of compressed air is often not readily available, and if water or oil is used instead as the operating fluid for the supply valve or other controlled member it is difficult to prevent leakage from the relay. Thirdly, the small driving power obtainable from the float is sometimes not enough to overcome the friction, so that the apparatus does not respond accurately to variations in the liquid level. Lastly, the relay must be close to the container, and if the latter is connected to a steam boiler the piston is liable to be overheated by radiation; if the container is connected to an evaporator for sugar juice it is found that the juice sometimes escapes past the gland in the container wall and makes the relay stick.

In apparatus of the kind set forth all these difficulties are overcome by means of the invention. This consists broadly in making the part of the relay which is moved by the supply valve or other controlled member a carriage for means through which the movement of the supply valve or other controlled member is itself controlled and actuating this means magnetically by the part moved by the float or other prime mover. The relay parts may be on opposite sides of a non-magnetic part of a wall of a pressure tight container, so that no gland is required.

The accompanying drawings show one example of apparatus including a device embodying the invention. In these drawings:

Figures 1 to 4 are diagrams showing different positions of operation of the apparatus;

Figure 5 is a side elevation on a larger scale of the magnetic transmission; and Figure 6 is a view of the transmission from the direction of the arrow VI in Figure 5.

In the apparatus shown in the drawings water is supplied to a boiler 2 through a valve 4 and a pipe 6. The allowable range of the water level in the boiler is indicated at 8 in Figure 1. The apparatus is arranged so that as the water level rises towards the upper limit of the range the valve 4 closes progressively while as the water level falls towards the lower limit the valve opens progressively.

The boiler 2 communicates through water and steam connections 12 and 14 with a float chamber 16 and from this chamber a non-magnetic tube 18 projects vertically upwards. This tube is closed at its outer end and is made sufficiently strong to withstand the pressure inside the boiler. A float 20 in the chamber 16 carries a rod 22 on the upper end of which is a long magnetic member 24 which is for convenience made up of two permanent bar magnets end to end in a non-magnetic housing. There need be no appreciable frictional resistance to the movement of the magnetic member within the tube, since it need not make a very close fit.

Sliding on the outside of the tube 18 is a carriage 26 comprising two plates 28 connected together by pillars 30. Two brackets 32 are mounted on two of the pillars 30, and cradles 34 are journalled on pivot pins 36 in these brackets. Each cradle carries a permanent bar magnet 38, 39 and a single pole on-off mercury switch 40, 41. These two magnets can be mounted to rock with hardly any frictional resistance.

The polar arrangement of the permanent magnets is indicated in Figure 5. There is magnetic repulsion between adjacent poles of the magnetic member 24 and the magnets 38, 39. Thus, when the magnetic member 24 is in a central position with respect to the carriage 26, the magnet 38 and switch 40 are inclined in an anti-clockwise direction against a stop, while the magnet 39 and switch 41 are inclined in a clockwise direction against a further stop into the position shown in Figure 5. When the magnetic member 24 is raised with respect to the carriage 26 there comes a point at which the magnet 38 and switch 40 snap over in a clockwise direction to engage a further stop. There is no effect on the magnet 39 and switch 41. When the magnetic member 24 returns to a central position with respect to the carriage 26 the magnet 38 and switch 40 revert with snap action to their initial positions. Likewise downward movement of the magnetic member 24 with respect to the carriage 26 causes the magnet 39 and switch 41 to move anti-clockwise with snap action and to return when the magnetic member 24 returns.

The carriage 26 is connected to the stem of the valve member 10 through a rocking lever 42, a cable 44 and a further rocking lever 46. The travel of the carriage 26 corresponding to full travel of the valve member 10 can be varied by movement of the pivot 48 of the lever 42.

The valve 4 is closed by admission of hydraulic fluid under pressure into a chamber 50 to act on a piston 52 on the stem of the valve member 10. The valve is opened by a spring 54 upon release of hydraulic fluid from the chamber 50. The admission and release of hydraulic fluid is controlled by two valves 56 and 58 controlled by solenoids which are in turn controlled by the switches 40 and 41. The action of the valves and switches will be clearest on consideration of a cycle of operation.

In Figure 1 the water level is in an intermediate position and the valve member 10 is also in an intermediate position and is stationary. The magnets 38 and 39 are in the same positions as are shown in Figure 5. The switch 41 is open and hence the valve 58 controlled by it is closed. Thus hydraulic fluid is prevented from escaping from the chamber 50 to a return pipe 60. At the same time the switch 40 is closed so that the valve 56 controlled by it is open and hydraulic fluid from a supply pipe 62 can pass freely to a return pipe 64 and does not overcome a spring-loaded valve 66 which controls admission to the chamber 50.

Figure 2 shows a state of affairs in which the water level is rising and the valve 4 is closing. The speed of movement of the valve member when opening or closing is such that normally the carriage 26 catches up the magnetic member 24. Thus if the water level changes considerably, the valve member responds in a series of steps of movement. Figure 2 shows the beginning of one step of movement. The magnetic member 24 has risen and the carriage 26 has so far risen a lesser distance. Accordingly the magnet 38 and switch 40 have changed over and the valve 56 has closed. The hydraulic fluid can no longer pass freely from the pipe 62 to the pipe 64 and hence is overcoming the spring-loaded valve 66 and entering the chamber 50, so moving the valve member 10 towards the closed position. The resultant upward movement of the carriage 26 with respect to the magnetic member 24 causes the magnet 38 and switch 40 to revert to their initial position. The valve member can proceed by a series of such steps to the state shown in Figure 3 in which the water level is at its highest and the valve 4 is completely shut.

Figure 4 shows a condition in which the water level is falling and the valve 4 from being shut is just beginning to open. Accordingly the magnetic member 24 is downwardly displaced with respect to the carriage 26 and the magnet 39 and switch 41 have changed over. Thus the valve 58 is opened and hydraulic fluid is permitted to escape from the chamber 50 to the return pipe 60 so that the valve member 10 is moved towards the open position under the action of the spring 54. The resultant downward movement of the carriage 26 with respect to the magnetic member 24 causes the magnet 39 and switch 41 to revert to their initial positions.

The duration of each step of movement depends on the rate at which the water level is changing and if that rate should, through a small range, exceed the speed of movement of the carriage, nevertheless the valve member will follow up until the initial relative positions of the carriage 26 and the magnetic member 24 are restored. The duration of each step also depends on the relative travel of the magnetic member and the carriage 26 between the position in which the magnetic member causes the appropriate magnet 38 or 39 to snap over and the position in which it causes the same magnet to snap back. This travel can be considered as magnetic lost motion. Moreover a further lost motion comes into play when the direction of movement of the water level reverses. This lost motion is the travel of the magnetic member from the position in which it causes one of the magnets 38 or 39 to snap back, to the position in which it causes the other magnet to snap over. It will be apparent that to each stationary position of the valve member there corresponds a small range of water levels. Thus minor fluctuations in water level do not cause unduly frequent movements of the valve member.

Apart from the adjustment of the pivot 48 it is also possible to adjust this apparatus by movement of the brackets 32 up or down on the pillars. By these adjustments a larger or smaller range of water level and larger or smaller lost motion may be permitted according to circumstances. It may, for example, be found that in a boiler it is disadvantageous to admit feed water unless the water level has fallen close to the minimum permissible.

The apparatus described in detail may be varied in different ways. Thus the magnets may work by attraction instead of repulsion. Further, the devices on the carriage, instead of being mercury switches, may comprise air-gap switches. Again, there need not be two devices on the carriage, but instead a single magnet may operate a single-pole double-throw switch or two on-off switches. With a single magnet operated by repulsion, there will be no intermediate position and hence the controlled member will hunt. Yet again, the construction of the magnets may vary; for instance a horse-shoe magnet mounted to rock about a horizontal axis may embrace the tube, and operate either a single double-throw switch or two switches. With such a magnet the magnetic member carried by the float-rod may be an armature which is not itself a permanent magnet.

Moreover in apparatus according to the invention the way in which the controlled member is operated can be varied widely; for instance, it may be moved by compressed air, the pneumatic system being controlled by pilot valves which control the supply and escape of air and which form the essential parts of the devices on the carriage. Likewise, the connection between the controlled member and the carriage may be of any convenient kind. All that is necessary is that as the supply valve or other controlled member moves, the carriage shall likewise move. Preferably, however, the relay parts are connected mechanically to the prime mover and to the controlled member.

I claim:

1. A relay device comprising a prime mover, a controlled member, a carriage, means interconnecting said carriage and said controlled member whereby said carriage is movable by said controlled member, first magnetic means movably mounted on said carriage, second magnetic means movable by said prime mover and interacting magnetically with said first magnetic means, operating means operatively interconnected with said controlled member for moving said controlled member, and means connecting said operating means with said first magnetic means whereby said operating means is controlled by the relative positions of said magnetic means and serves upon relative displacement of said magnetic means to move said controlled member in a direction which, by movement of said carriage, restores the initial relative positions of said magnetic means.

2. A device as claimed in claim 1 wherein both said magnetic means comprise permanent magnets.

3. A device as claimed in claim 2 wherein said magnets are disposed with like poles adjacent and interact by repulsion.

4. In conjunction with a liquid container, a device comprising a float responsive to the level of liquid in the container, a valve member controlling supply of liquid to the container, a carriage movable by said valve member, first magnetic means movably mounted on said carriage, second magnetic means movable by said float and interacting magnetically with said first magnetic means, operating means operatively interconnected with said valve member for moving said valve member, and means connecting said operating means with said first magnetic means whereby said operating means is controlled by the relative positions of said magnetic means and serves upon relative displacement of said magnetic means to move said valve member in a direction which, by movement of said carriage, restores the initial relative positions of said magnetic means.

5. A device as claimed in claim 4 wherein said second magnetic means moves in a pressure-tight non-magnetic tube which communicates with the container, and said carriage slides on the outside of said tube.

6. A device as claimed in claim 4 wherein both said magnetic means comprise permanent magnets.

7. A device as claimed in claim 6 wherein said magnets are disposed with like poles adjacent and interact by repulsion.

8. A device as claimed in claim 4 wherein said first magnetic means includes two permanent magnets, said permanent magnets being disposed adjacent opposite ends of said first magnetic means, one of said magnets being responsive to relative displacement of said carriage and said second magnetic means in one direction from a central position and the other of said magnets being responsive to contrary relative displacement.

9. A device as claimed in claim 4 wherein said operating means includes at least one electric switch mounted on said carriage and means interconnecting said first magnetic means and said switch whereby movement of said first magnetic means operates said switch.

10. A device as claimed in claim 4 wherein said second magnetic member is mechanically connected to said float and said carriage is mechanically connected to said valve member.

11. A relay device comprising, a float disposed in a liquid container, first magnetic means interconnected with the said float, second magnetic means disposed adjacent to the said first magnetic means and responsive to movement thereof, a valve, means interconnecting said second magnetic means and said valve for operating the valve whereby the position of the valve is determined by the position of said second magnetic means, and means for moving said second magnetic means in response to movement of said valve.

12. In conjunction with a liquid container, a device comprising means responsive to a condition in said container, a valve member controlling supply of liquid to the container, a carriage movable by said valve member, first magnetic means movably mounted on said carriage, second magnetic means movable by said responsive means and interacting magnetically with said first magnetic means, operating means operatively interconnected with said valve member for moving said valve member, means connecting said operating means with said first magnetic means whereby said operating means is controlled by the relative positions of said magnetic means and serves upon relative displacement of said magnetic means to move said valve member in a direction which, by movement of said carriage, restores the initial relative positions of said magnetic means.

References Cited in the file of this patent

UNITED STATES PATENTS

| 956,030 | Bennett | Apr. 26, 1910 |
| 2,231,158 | Davis | Feb. 11, 1941 |